(12) United States Patent
Kobayashi

(10) Patent No.: US 7,439,879 B2
(45) Date of Patent: Oct. 21, 2008

(54) INTERFACE CIRCUIT AND BINARY DATA TRANSFER METHOD

(75) Inventor: Naoki Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/711,750

(22) Filed: Feb. 28, 2007

(65) Prior Publication Data

US 2007/0205926 A1    Sep. 6, 2007

(30) Foreign Application Priority Data

Mar. 1, 2006    (JP) .............................. 2006-055304

(51) Int. Cl.
  *H03M 7/34*        (2006.01)
(52) U.S. Cl. ......................................... 341/51; 341/55
(58) Field of Classification Search ............. 341/50–90;
                    327/72, 75; 369/34, 53
  See application file for complete search history.

(56) References Cited

U.S. PATENT DOCUMENTS 5,517,331 A * 5/1996 Murai et al. ................. 358/486
5,793,722 A * 8/1998 Yamamuro ............... 369/44.28
5,856,750 A   1/1999 Kosecki
7,180,966 B2 * 2/2007 Vallet et al. .................. 375/340

FOREIGN PATENT DOCUMENTS

JP      408237617 A  *  9/1996
JP      9-232923         9/1997

* cited by examiner

*Primary Examiner*—Lam T Mai
(74) *Attorney, Agent, or Firm*—Young & Thompson

(57) ABSTRACT

An interface circuit capable of controlling a noise margin and a time margin for producing an output a binary data is realized. The circuit comprises a detecting unit for detecting a transition state of logic levels in received binary data corresponding to preceding two clock signals, an output signal producing unit for producing an output binary data based on the received binary data by using a reference voltage and by latching the binary data using the clock signal, a reference voltage control unit for controlling the reference voltage, and a clock phase control unit for controlling a phase of the clock signal. The noise margin can be controlled by changing the reference voltage in accordance with the detected transition state, and the time margin can be controlled by changing the clock phase in accordance with the detected transition state.

14 Claims, 13 Drawing Sheets

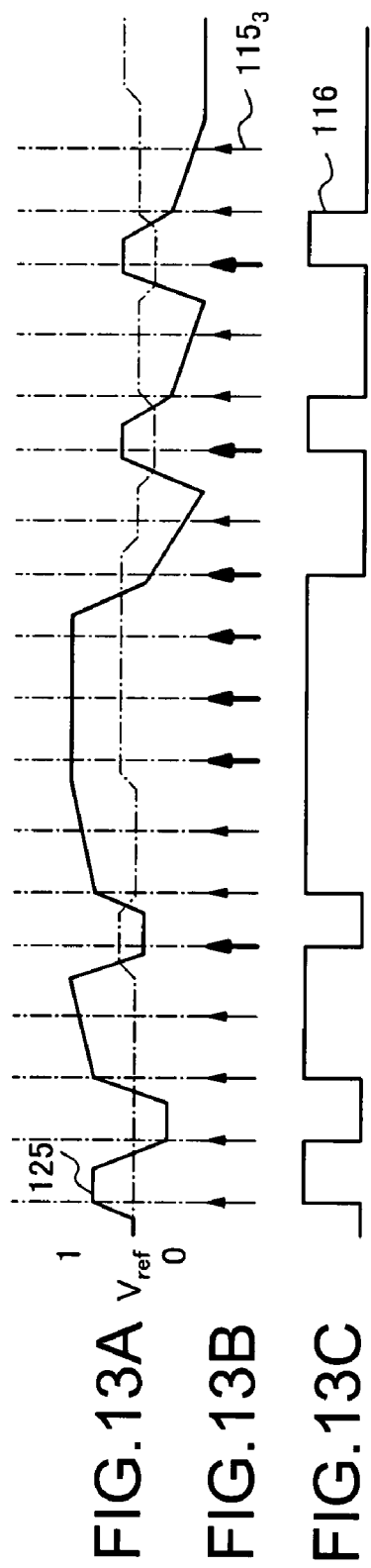

INTERFACE CIRCUIT AND BINARY DATA TRANSFER METHOD

BACKGROUND OF THE INVENTION

1. Field of the Invention

The present invention relates to an interface circuit and a binary data transfer method, which are used in various sorts of electronic apparatuses and communication terminals. More specifically, the present invention relates to the interface circuit and the binary data transfer method, which are suitable for transmitting and receiving binary data signals at high communication environment.

2. Description of the Related Art

An interface circuit for transmitting and receiving binary data compares a received data signal voltage with a reference voltage so as to judge whether a level of the received data is "0 (low level)" or "1 (high level)". In general, a reference voltage "Vref" is fixed to a predetermined voltage between a signal level of "0" and a signal level of "1".

However, in a case where the reference voltage Vref is fixed, if common noise produced between a signal line and a ground is mixed into an original data signal, a potential difference between the ground level of a transmission side and the ground level of a reception side arises, namely, a ground potential difference arises. As a result, there is such a problem that a noise margin is narrowed due to the above-mentioned ground potential difference. Accordingly, a technical solution has been proposed in which the reference voltage Vref on the transmission side is utilized also on the reception side. Also, JP-A-9-232923 has proposed such a technique of dynamically controlling the reference voltage Vref.

In accordance with this technical proposition, when a level of a received transfer signal is changed from a high level to a low level, or from the low level to the high level, an interface circuit detects the change in the level, and samples a potential of a state after the level has been changed. As a result, the interface circuit acquires thereinto information about a voltage variation with respect also to a transfer signal which contains the voltage variation arose in a transfer path. Then, the interface circuit separately controls a logical threshold value with respect to rising of the transfer signal to the high level at a leading edge, and a logical threshold value with respect to falling of the transfer signal to the low level at a trailing edge. As previously described, this technical proposition dynamically controls the reference voltage Vref.

However, in this technical proposition, a data signal is actually received on the reception side, and thereafter, the reference voltage Vref is set by employing a signal level of the received data signal. As a consequence, this technical proposition cannot be used in a case where the data signal is required to be captured by a storage means (flip-flop circuit etc.) before the reference voltage Vref is dynamically controlled at each of time instants. Accordingly, this technical proposition cannot achieve an effect of enlarging a noise margin. In accordance with this technical proposition, for instance, in such a data transfer region that an operating frequency is high, the noise margin is brought into a narrow state. As a result, this technical proposition is not suitably applied to a high speed operation.

A differential transfer system is a technique of enlarging a noise margin before data is received. In the differential transfer system, a data signal which is intended to be transferred and an inverted data signal whose logic state is inverted are paired, and transferred by using a pair of signal lines. As a result, the differential transfer system has a higher resistance to common noise which is applied to respective signal lines of the pair in a similar manner, so high-speed operation can be easily performed.

However, in order that the differential transfer system is properly used, the two signal lines must be wired in such a manner that influences of delays and noise on signals of two systems transferred through the respective signal lines are made equal to each other. This leads to such a problem that a degree of difficulty of the wiring becomes higher, which increases cost of the wiring.

Further, in order to perform a synchronous transfer, the interface circuit for transmitting and receiving the data must synchronize the timing of the clock for capturing the received data by the storage means (flip-flop circuits etc.) with the timing of the clock on the transmission side. As a result, in the region of the high operating frequency, such a circuit arrangement for taking the clocks in all of the storage means (flip-flop circuits etc.) at the same time is employed. Accordingly, there is such a problem that electro magnetic interference (EMI) causing a power supply noise and an electromagnetic wave failure is increased.

SUMMARY OF THE INVENTION

The present invention has been made to solve the above-mentioned problems, and therefore, has an object to provide an interface circuit and a binary data transfer method, capable of enlarging a noise margin when binary data is received on the reception side, and also capable of reducing an occurrence of noise.

According to the present invention, an interface circuit for receiving and outputting a binary data signal in synchronization with a clock signal comprises a detecting unit which detects a transition state of logic levels in received binary data signal corresponding to preceding two clock signals, a output signal producing unit which produces an output binary data signal based on the received binary data signal by using a reference voltage for judging logic level of 0 or 1 and by latching the binary data signal using the clock signal, a reference voltage control unit which controls to vary the reference voltage to be supplied to the output signal producing unit in accordance with the transition state detected by the detecting unit, and a clock phase control unit which controls to vary a phase of the clock signal to be supplied to the output signal producing unit in accordance with the transition state detected by the detecting unit.

The noise margin can be enlarged by controlling the reference voltage, which is used for judging logic level of 0 or 1 for producing an output binary data, in accordance with the transition state of logic levels in received binary data signal corresponding to preceding two clock signals.

Simultaneous operation of all flip-flop circuits can be avoided by controlling the phase of clock signal, which is used for capturing an output binary data in each of the flip-flop circuits, in accordance with the transition state of logic levels in received binary data signal corresponding to preceding two clock signals.

More specifically, there are four transition states, from 0 to 0, from 0 to 1, from 1 to 0 and from 1 to 1, of the logic levels corresponding to preceding two clock signals.

The reference voltage is set to a center level of amplitude of the logic level when the transition state is from 0 to 1 or from 1 to 0 as a normal condition. With respect to the severe conditions of the noise margin, the reference voltage is set to lower level than the center level when the transition state is from 0 to 0, and the reference voltage is set to higher level than the center level when the transition state is from 1 to 1.

The clock phase is controlled without delay when the transition state is from 0 to 1 or from 1 to 0 as a normal condition, and the clock phase is controlled with adding a predetermined delay for enlarging a time margin when the transition state is from 0 to 0 or from 1 to 1.

BRIEF DESCRIPTION OF THE DRAWINGS

Exemplary features and advantages of the present invention will become apparent from the following detailed description when taken with the accompanying drawings in which:

FIG. 5A shows both an amplitude of the reception data 125 entered in the input buffer 112, and the reference voltage Vref controlled by the reference voltage adjusting signal 124. FIG. 5B shows respective timing of the third clock signal $115_3$. FIG. 5C shows a waveform of the data 116 output from the third flip-flop circuit 113.

FIG. 10A shows a waveform change of the amplitude of the reception data 125 of the input buffer 112. FIG. 10B shows the fourth clock signal $115_4$. FIG. 10C represents a waveform of the data 116 output from the third flip-flop circuit 113.

FIG. 13 is a diagram for showing waveforms of the reception data 125 entered to the input buffer 112 and data output from the third flip-flop circuit 113 in the interface circuit 100 having the circuit arrangement shown in FIG. 2. FIG. 13A shows a change in the amplitudes of the reception data 125 of the input buffer 112, and a waveform change of the reference voltage Vref indicated by the reference voltage adjusting signal 124. FIG. 13B indicates a fourth clock signal $115_4$. FIG. 13C represents a waveform of the data 116 output from the third flip-flop circuit 113.

DETAILED DESCRIPTION-OF THE PREFERRED EMBODIMENTS

A detailed description is made of an embodiment of the present invention.

Figure 1:
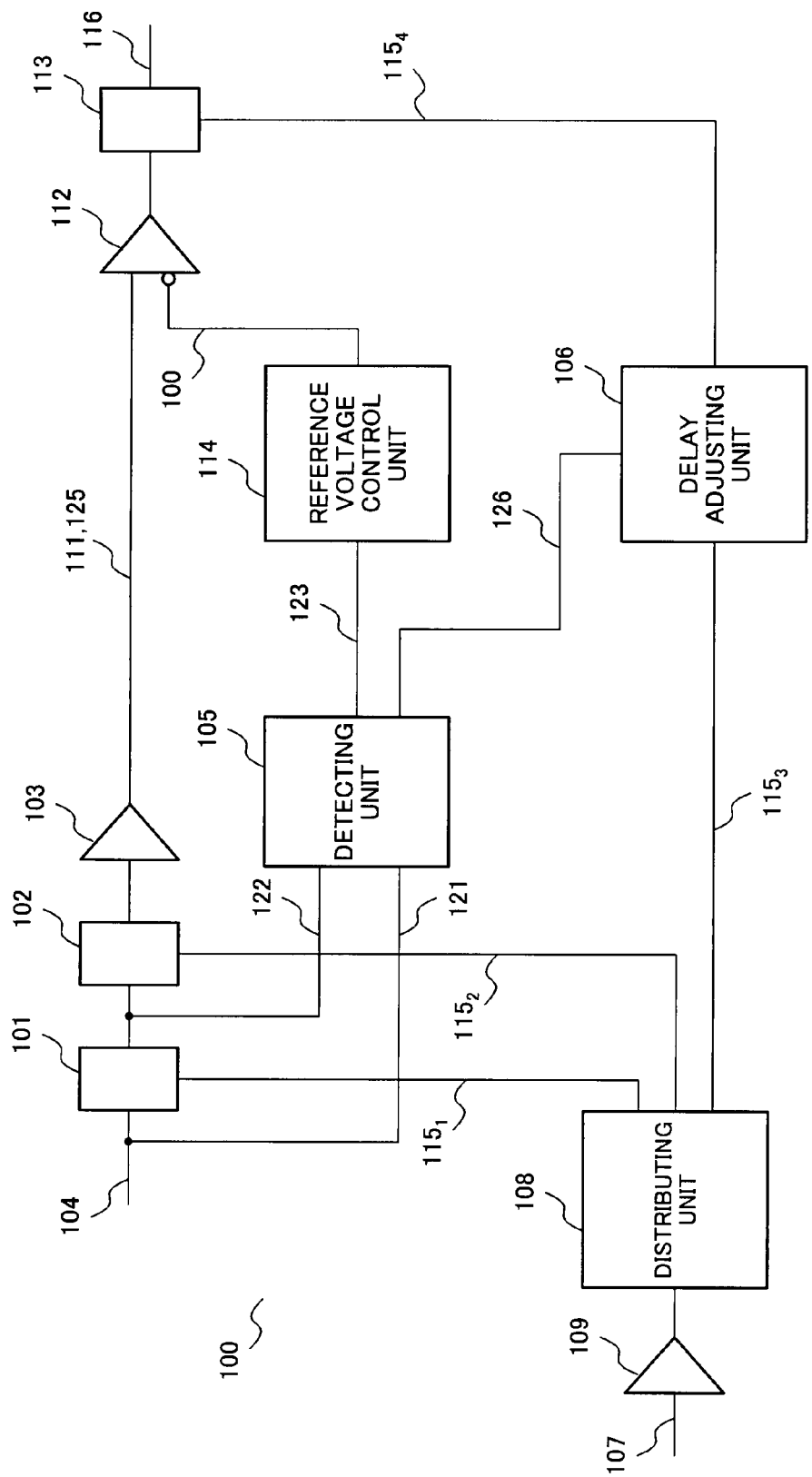
FIG. 1 is a block diagram for conceptionally showing an interface circuit according to an embodiment of the present invention.

FIG. 1 shows a conceptional idea of an interface circuit according to an embodiment of the present invention. A transmission side of the interface circuit 100 is formed of the following circuits; namely, a first flip-flop circuit 101 and a second flip-flop circuit 102, which are connected in series to the transmission side; a transmission buffer 103 connected to the output side of the second flip-flop circuit 102; a detecting unit 105; and a distributing unit 108. The detecting unit 105 detects switching of logic states ("0"→"0", "0"→"1", "1"→"0", and "1"→"1") of transmission data 104 on the transmission side by checking states of input sides of both the first flip-flop circuit 101 and the second flip-flop circuit 102. The distributing unit 108 distributes a clock signal 107 with respect to the first flip-flop circuit 101 and the second flip-flop circuit 102, and also, a delay adjusting unit 106 provided on the reception side. An input buffer 109 is connected to the input side of the distributing unit 108.

Further, a reception side of the interface circuit 100 is formed of the following circuits; namely, an input buffer 112 into which data is input from the transmission buffer 103 via a signal line 111; a third flip-flop circuit 113 connected to the output side of the input buffer 112; a reference voltage control unit 114 for controlling a reference voltage "Vref" of the input buffer 112; and a delay adjusting unit 106 which inputs a third clock signal "$115_3$" distributed from the distributing unit 108 so as to adjust a delay amount.

It should be understood that a first clock signal "$115_1$" is supplied to the first flip-flop circuit 101, whereas a second clock signal "$115_2$" is supplied to the second flip-flop circuit 102.

In the interface circuit 100, the detecting unit 105 detects switching of the logic states of the transmission data 104 on the transmission side. Concretely speaking, potential signals 121 and 122 indicative of potentials on the input sides of the first flip-flop circuit 101 and the second flip-flop circuit 102 respectively are input to the detecting unit 105, and when a state of the transmission data 104 is switched from "0" to "0", from "0" to "1", from "1" to "0", or from "1" to "1" respectively, the detecting unit 105 detects those switched states. The reference voltage control unit 114 outputs a reference voltage adjusting signal 124 so as to control the reference voltage Vref of the input buffer 112 in accordance with a detection result 123 of the detecting unit 105.

Concretely speaking, in the case where the detection result 123 indicates switching of the state from "0" to "1", or switching of the state from "1" to "0", the reference voltage control unit 114 sets the reference voltage Vref to become a center level of an amplitude of the reception data 125 (a center level of the logic level between 0 and 1). Also, in a case where the detection result 123 is not changed as in the case of "0" to "0", the reference voltage control unit 114 sets the reference voltage Vref to become a value lower than the center level of amplitude value of the reception data 125. Also, in a case where the detection result 123 is not changed as in the case of "1" to "1", the reference voltage control unit 114 sets the reference voltage Vref to become a value higher than the center level of amplitude value of the reception data 125.

Next, a description is made of the delay adjusting unit 106. The delay adjusting unit 106 adjusts a phase of the third clock signal $115_3$ distributed by the distributing unit 108 based upon a detection result 126 of the detecting unit 105. Concretely speaking, in the case where the detection result 126 of the detecting unit 105 indicates switching of the state from "0" to "1", or switching of the state from "1" to "0", the delay adjusting unit 106 sets the delay amount to a minimum value. Also, in a case where the detection result 126 is not changed as in the case of "0" to "0" or "1" to "1", the delay adjusting unit 106 increases the delay amount. As previously described, the delay adjusting unit 106 can delay a phase of a fourth clock signal "$115_4$" which is supplied to the third flip-flop circuit 113. Data 116 is output from the third flip-flop circuit 113.

As previously described, the interface circuit 100 detects the switching condition of the logic state of the transmission data 104, and adjusts the reference voltage Vref of the input buffer 112 provided on the reception side based upon this detected condition. As a consequence, as will be described later in detail, even in such a case that the operating frequency of the transmission data 104 is increased, a complex wiring is no longer required, and a noise margin of the reception data 116 is enlarged. Further, the delay adjusting unit 106 adjusts the phase of the fourth clock signal $115_4$ which is supplied to the third flip-flop circuit 113 according to the switching condition of the logic state of the transmission data 104. As a consequence, in the interface circuit 100, a total number of the flip-flop circuits which are operated at the same time during a synchronous transfer operation can be reduced. As a result, the interface circuit according to the present invention can reduce the power supply noise and the electromagnetic wave failure caused by the EMI without lowering the operating frequency.

Figure 2:
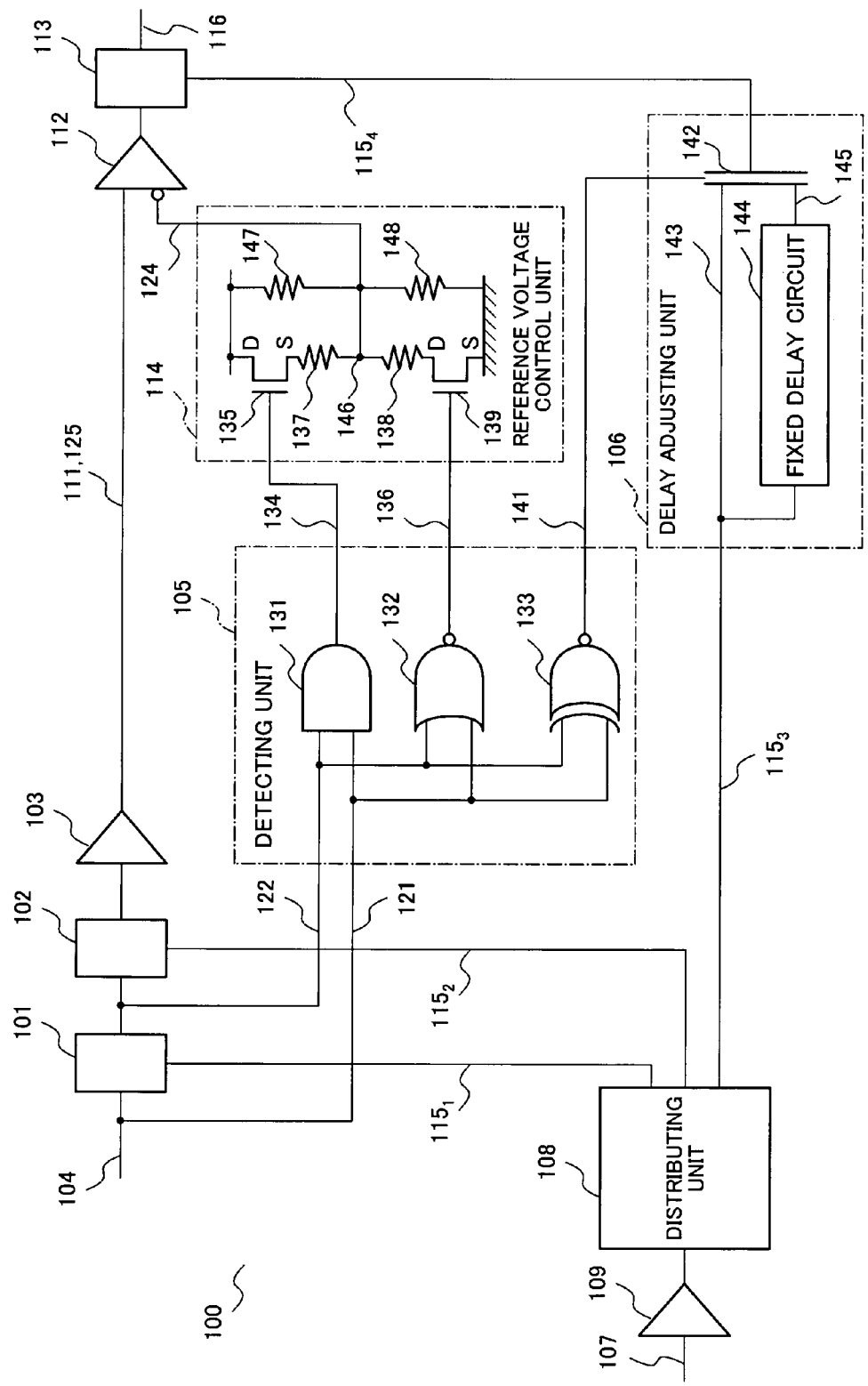
FIG. 2 is a circuit diagram for specifically showing the interface circuit according to the embodiment of the present invention.

FIG. 2 shows a concrete circuit arrangement of the interface circuit according to the embodiment. The detecting unit 105 contained in the interface circuit 100 is provided with an AND circuit 131, a NOR circuit 132, and an exclusive NOR circuit 133, which commonly input thereinto the potential signals 121 and 122 indicative of the potentials on the input sides of the first flip-flop circuit 101 and the second flip-flop circuit 102 respectively. A logical output 134 of the AND circuit 131 is applied to a gate of an N-channel metal oxide semiconductor (MOS) transistor 135 (namely, transistor provided on an upper side in FIG. 2) which constitutes the reference voltage control unit 114. A logical output 136 of the NOR circuit 132 is applied to a gate of another N-channel MOS transistor (namely, transistor provided on a lower side in FIG. 2) that is coupled with the upper-side transistor 135 via resistors 137 and 138.

A logical output 141 of the exclusive NOR circuit 133 is supplied as a control signal to a selector 142 of the delay adjusting unit 106. The delay adjusting unit 106 is equipped with a line path 143 which directly conducts the third clock signal $115_3$ to the selector 142, and another line path 145 which conducts the third clock signal $115_3$ via a fixed delay circuit 144 to the selector 142. Then, when the logic output 141 is a low level ("0"), the delay adjusting unit 106 causes the selector 142 to select the third clock signal $115_3$ which has no delay and is supplied via the line path 143, and then, outputs the selected third clock signal $115_3$ as a fourth clock signal $115_4$. Also, when the logical output 141 is a high level ("1"), the delay adjusting unit 106 causes the selector 142 to select the third clock signal $115_3$ which has been delayed and is supplied via the fixed delay circuit 144, and then, outputs the selected delayed third clock signal $115_3$ as a fourth clock signal $115_4$.

In this case, two logical outputs 134 and 136 correspond to the detection result 123 of FIG. 1, whereas the logical output 141 corresponds to the detection result 126 of FIG. 1.

The reference voltage control unit 114 is equipped with a resistor 147, and another resistor 148. One terminal of the resistor 147 is connected to a drain "D" of the upper-side transistor 135, and the other terminal thereof is connected to a junction point 146 between the resistor 137 and the resistor 138. One terminal of the resistor 148 is connected to a source "S" of the lower-side transistor 139, and the other terminal thereof is connected to the junction point 146 between the resistor 137 and the resistor 138. The source "S" of the lower-side transistor 139 is grounded. A reference voltage adjusting signal 124 is supplied from the junction point 146 to the input buffer 112.

When both levels of the potential signals 121 and 122 which are input to the detecting unit 105, are equal to "0", or a level of one potential signal is "1" and a level of the other potential signal is "0", the logical output 134 of the AND circuit 131 is "0". At this time, this low level ("0") signal is applied to the gate of the upper-side transistor 135, and the upper-side transistor 135 is turned off. The upper-side transistor 135 is turned ON only when a higt level ("1") signal is applied to the gate, i.e. both the levels of the potential signals 121 and 122 are "1".

Also, when both levels of the potential signals 121 and 122 which are input to the detecting unit 105, are equal to "0", the logical output 136 of the NOR circuit 132 becomes a high level ("1"), so the lower-side transistor 139 is turned ON. When both levels of the potential signals 121 and 122 which are input to the detecting unit 105, are equal to "1", or a level of one potential signal is "1" and a level of the other potential signal is "0", the logical output 136 of the NOR circuit 132 becomes a low level ("0"), so the lower-side transistor 139 is turned OFF.

As a consequence, the reference voltage Vref which is controlled by the reference voltage adjusting signal 124 output from the reference voltage control unit 114 becomes a voltage at a voltage dividing point between the resistor 147 and the resistor 148. This is because when one of the potential signals 121 and 122 which are input to the detecting unit 105 is equal to "1" and the other thereof is equal to "0", both the upper-side transistor 135 and the lower-side transistor 139 are turned OFF. This voltage becomes an intermediate amplitude value of the reception data 125, and when resistance values of both resistors, 147 and 148 are the same value, it becomes a center level of amplitude of the reception data 125.

Also, in the case where both levels of the potential signals 121 and 122 which are entered to the detecting unit 105 are equal to "0", the upper-side transistor 135 is turned OFF, and the lower-side transistor 139 is turned ON. At this time, a combined resistance value of the two resistors 138 and 148 becomes lower than the resistance value of the resistor 148. As a consequence, in this case, the reference voltage Vref indicated by the reference voltage adjusting signal 124 becomes lower than the center level of amplitude value of the reception data 125.

Also, in the case where both levels of the potential signals 121 and 122 which are entered to the detecting unit 105 are equal to "1", the upper-side transistor 135 is turned ON, and the lower-side transistor 139 is turned OFF. At this time, a combined resistance value of the two resistors 137 and 147 becomes lower than the resistance value of the resistor 147. As a consequence, in this case, the reference voltage Vref indicated by the reference voltage adjusting signal 124 becomes higher than the center level of amplitude value of the reception data 125.

Figure 3:
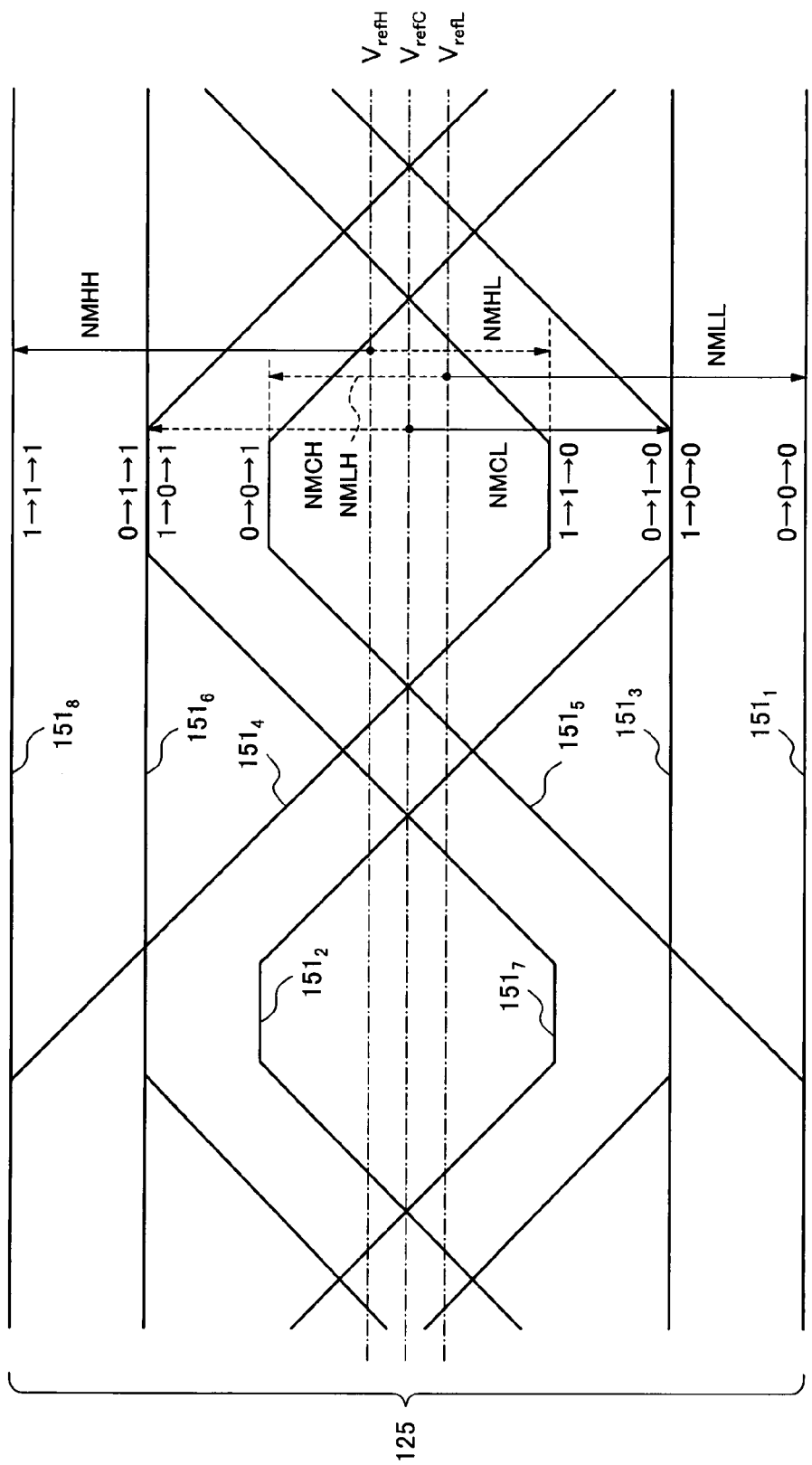
FIG. 3 is a diagram for representing a waveform of reception data by an eye pattern entered to an input buffer of the interface circuit shown in FIG. 2.

FIG. 3 is a diagram for showing a change in waveforms of reception data of the input buffer 112 by using an eye pattern. FIG. 3 simply represents conditions where signal levels of the reception data 125 are fluctuated when the transmission data 104 in FIG. 1 is switched from "0" to "0", from "0" to "1", from "1" to "0", or from "1" to "1". It is assumed that there is no influence caused by reflection noise and the like. FIG. 3 also shows a case where voltage control is not performed in the reference voltage control unit 114 shown in FIG. 2. Also, in order not to make a description of this case complex, the following example will now be described in the case where the delay adjusting unit 106 of FIG. 1 is not present. In other words, the third clock signal $115_3$, output from the distributing unit 108 is supplied to the third flip-flop circuit 113 without delaying the phase of the third clock signal $115_3$. A consideration as to a circuit arrangement to which the delay adjusting unit 106 is added will be described later.

Figure 4:
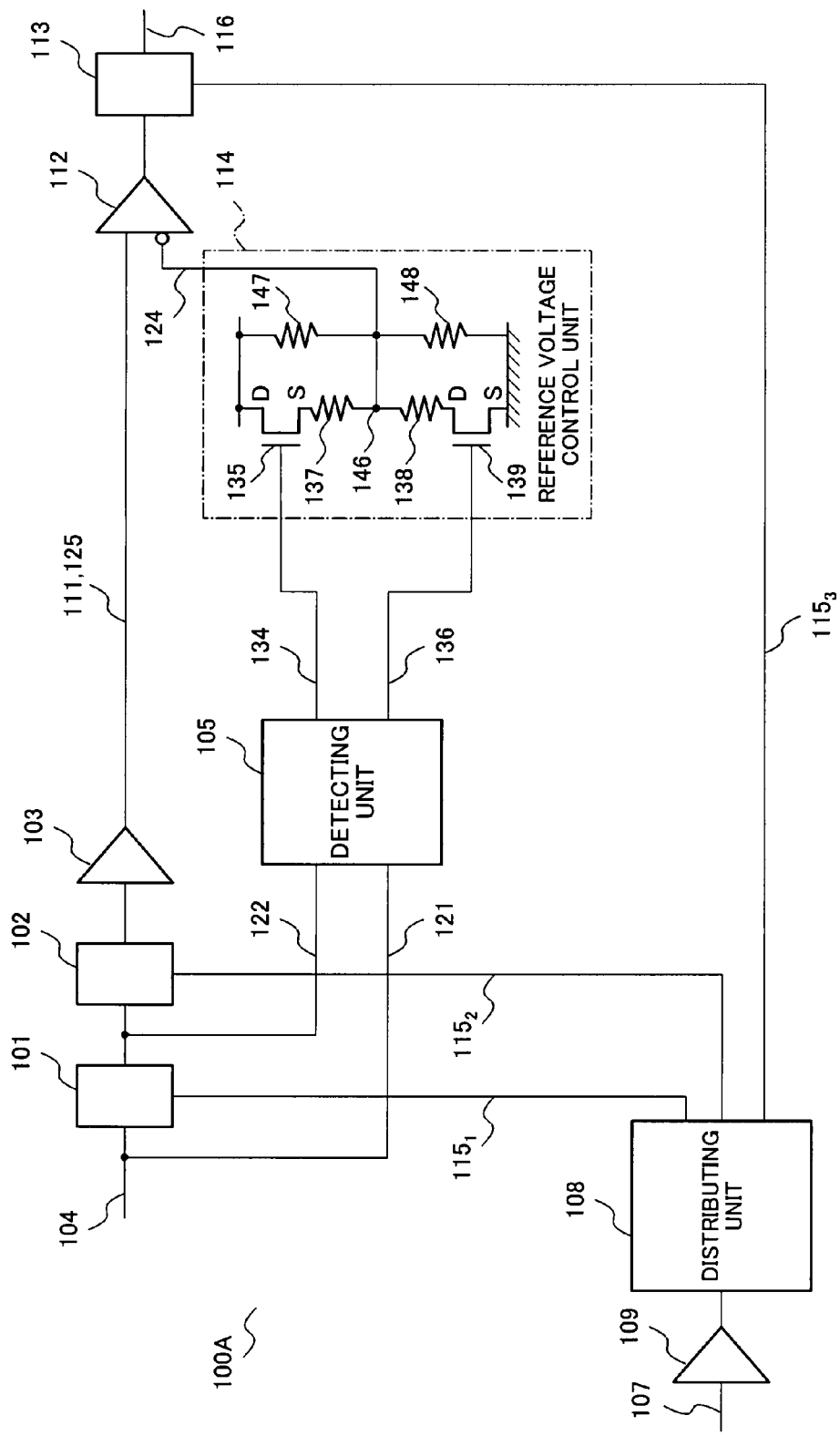
FIG. 4 is a simplified circuit diagram of the interface circuit according to the embodiment of the present invention.

FIG. 4 is a circuit diagram for representing an arrangement of a simplified interface circuit which is considered in this example. In order not to make a description complex, since the delay adjusting unit 106 shown in FIG. 1 is not present, the third clock signal $115_3$ distributed by the distributing unit 108 is directly supplied to the third flip-flop circuit 113.

On the other hand, a level of reception data input to the input buffer 112 of FIG. 4 is changed, depending upon both a logic state of the present reception data 125 and a logic state of the previous reception data. That is, the level of a reception signal changes due to switching of the logic state. For example, it is assumed that the logic state of the present reception data 125 is equal to "0". In a case where the logic state of the reception data 125 was not changed in the case of "0" to "0" and thereafter becomes the present state of "0", the level of the reception data 125 becomes a level indicated by a line $151_1$ of FIG. 3, so the present signal level becomes the lowest signal level. Also, in the case where the logic state of the reception data 125 was changed from "0" to "1" and thereafter becomes the present state of "0" (line $151_2$), or the logic state of the reception data 125 was changed from "1" to "0" and thereafter becomes the present state of "0" (line $151_3$), the present signal level becomes an intermediate value. Also, in a case where the logic state of the reception data 125 was not changed in the case of "1" to "1" and thereafter becomes the present state of "0" (line $151_4$), the signal level of the reception data 125 becomes the highest signal level.

On the other hand, it is assumed that the logic state of the present reception data 125 is equal to "1". In this case, also, there is a difference in signal levels, depending upon switching methods of past data. In a case where the logic state of the reception data 125 was not changed in the case of "0" to "0" and thereafter becomes the present state of "1" (line $151_5$), the level of the reception data 125 becomes the lowest signal level. In a case where the logic state of the reception data 125 was changed from "0" to "1" and thereafter becomes the present state of "1" (line $151_6$), or the logic state of the reception data 125 was changed from "1" to "0" and thereafter becomes the present state of "1" (line $151_7$), the signal level of the reception data 125 becomes an intermediate value. Also, in a case where the logic state of the reception data 125 was not changed in the case of "1" to "1" and thereafter becomes the present state of "1" (line $151_8$), the level of the reception data 125 becomes the highest signal level.

In response to a variation in signal levels of the reception data 125 as shown in FIG. 3, the reference voltage control unit 114 selectively sets one value within three values of the reference voltages Vref controlled by the reference voltage adjusting signal 124. As a result, in this embodiment, when the data is received, the noise margin is enlarged, so the operating frequency can be improved. In other words, under such a condition that the logic states of the potential signals 121 and 122 which are input to the detecting unit 105 of FIG. 4 are changed from "0" to "1", or from "1" to "0", the reference voltage control unit 114 sets the reference voltage Vref controlled by the reference voltage adjusting signal 124 as a center level "VrefC" of the reception data 125. Then, the noise margin is set to both a value "NMCH" and a value "NMCL" shown in FIG. 3.

Also, under such a condition that the logic states of the potential signals 121 and 122 which are entered to the detecting unit 105 shown in FIG. 4 are not changed in the case of "0" to "0", the reference voltage control unit 114 sets that the reference voltage Vref controlled by the reference voltage adjusting signal 124 as a value "VrefL" which is lower than the center level of amplitude value of the reception data 125. Then, the noise margin is set to both a value "NMLH" and a value "NMLL" shown in FIG. 3.

Also, under such a condition that the logic states of the potential signals 121 and 122 which are entered to the detecting unit 105 shown in FIG. 4 are not changed in the case of "1" to "1", the reference voltage control unit 114 sets the reference voltage Vref controlled by the reference voltage adjusting signal 124 as a value "VrefH" which is higher than the center level of amplitude value of the reception data 125. Then, the noise margin is set to both a value "NMHH" and a value "NMHL" shown in FIG. 3.

Figure 5:
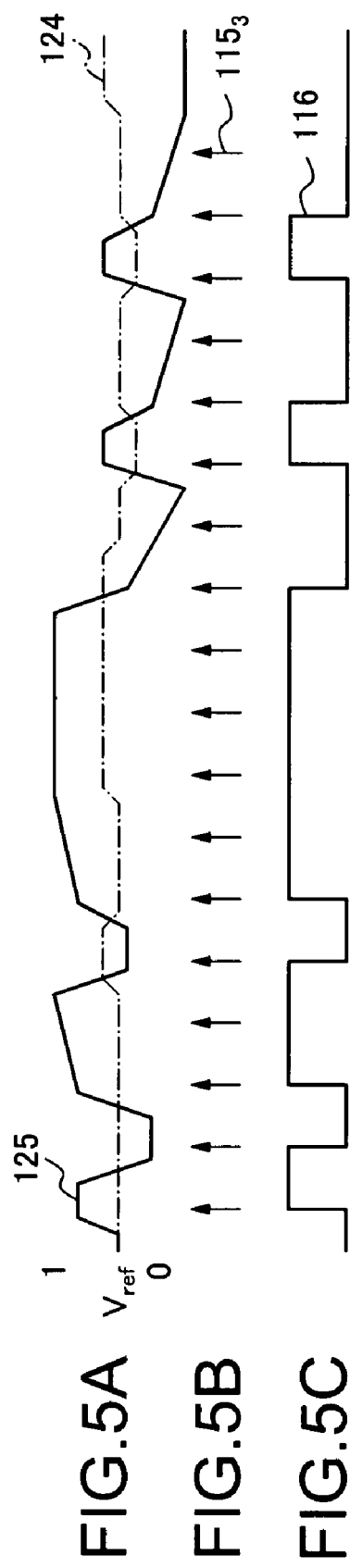
FIG. 5 is a diagram for representing waveforms of the reception data 125 input to the input buffer 112, and the data 116 output from the third flip-flop circuit 113 in the circuit arrangement shown in FIG. 4.

FIG. 5 is a diagram for representing waveforms of the reception data 125 input to the input buffer 112, and the data 116 output from the third flip-flop circuit 113 in the circuit arrangement shown in FIG. 4. FIG. 5A shows both an amplitude of the reception data 125 entered in the input buffer 112, and the reference voltage Vref controlled by the reference voltage adjusting signal 124. FIG. 5B shows respective timing of the third clock signal $115_3$. FIG. 5C shows a waveform of the data 116 output from the third flip-flop circuit 113.

As previously described as the circuit operation of FIG. 4, in such a case that the logic states of the potential signals 121 and 122 which are entered to the detecting unit 105 are changed from "0" to "1", or from "1" to "0", the reference voltage control unit 114 sets the reference voltage Vref controlled by the reference voltage adjusting signal 124 as the center level of amplitude value "VrefC" of the reception data 125.

Also, in such a case that the logic states of the potential signals 121 and 122 which are entered to the detecting unit 105 are not changed in the case of "0" to "0", the reference voltage control unit 114 sets the reference voltage Vref controlled by the reference voltage adjusting signal 124 as a value "VrefL" which is lower than the center level of amplitude value of the reception data 125.

Also, in such a case that the logic states of the potential signals 121 and 122 which are entered to the detecting unit 105 are not changed in the case of "1" to "1", the reference voltage control unit 114 sets the reference voltage Vref controlled by the reference voltage adjusting signal 124 as a value "VrefH" which is higher than the center level of amplitude value of the reception data 125.

As a result, the noise margin is enlarged when the data is received.

Figure 6:
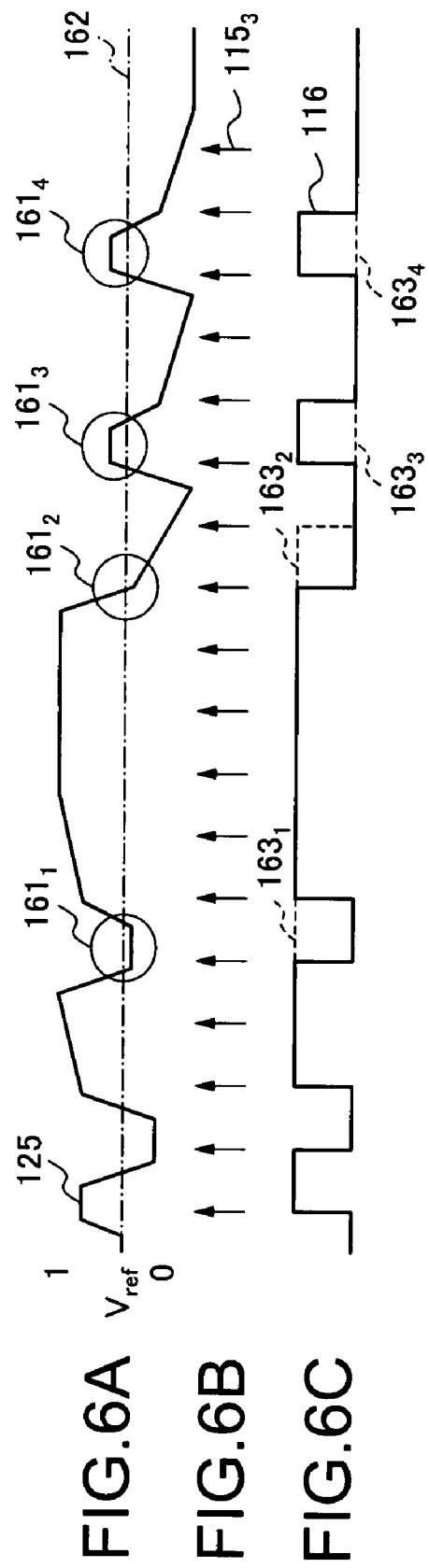
FIG. 6A to FIG. 6C are waveform diagrams with respect to the same reception data and output data as those of FIG. 5A~5C in a case where a reference voltage "Vref" is fixed.

For the purpose of reference, FIG. 6C is a waveform diagram for representing data output from the third flip-flop circuit 113 when the reference voltage Vref is fixed in such a case that the same reception data 125 as that of FIG. 5 is inputted to the input buffer 112. FIG. 6A shows both an amplitude of the reception data 125 entered in the input buffer 112, and the reference voltage Vref that is fixed value. FIG. 6B shows respective timing of the third clock signal $115_3$. FIG. 6C shows a waveform of the data 116 output from the third flip-flop circuit 113. In this case, the reference voltage Vref indicated by the reference voltage adjusting signal 124 is fixed at a predetermined voltage between "0" and "1", for instance, such a voltage that becomes the center level of the amplitude. Such a method corresponds to the conventional method. As described above, if the reference voltage Vref is the fixed value, a voltage difference between the reception data 125 (see FIG. 6A) and the reference voltage adjusting signal 162 (see FIG. 6A) of the fixed reference voltage Vref is small at each of places indicated by circles $161_1$ to $161_4$. As a result, the noise margin also becomes a small value. As a result, when the third flip-flop circuit 113 captures data in response to the third clock signal $115_3$ (see FIG. 6B), there are some possibilities that a failure may occur. In other words, there is such a risk that errors indicated by broken-line portions $163_1$ to $163_4$ may occur in the reception data 116 (see FIG. 6C) output from the third flip-flop circuit 113.

Figure 7:
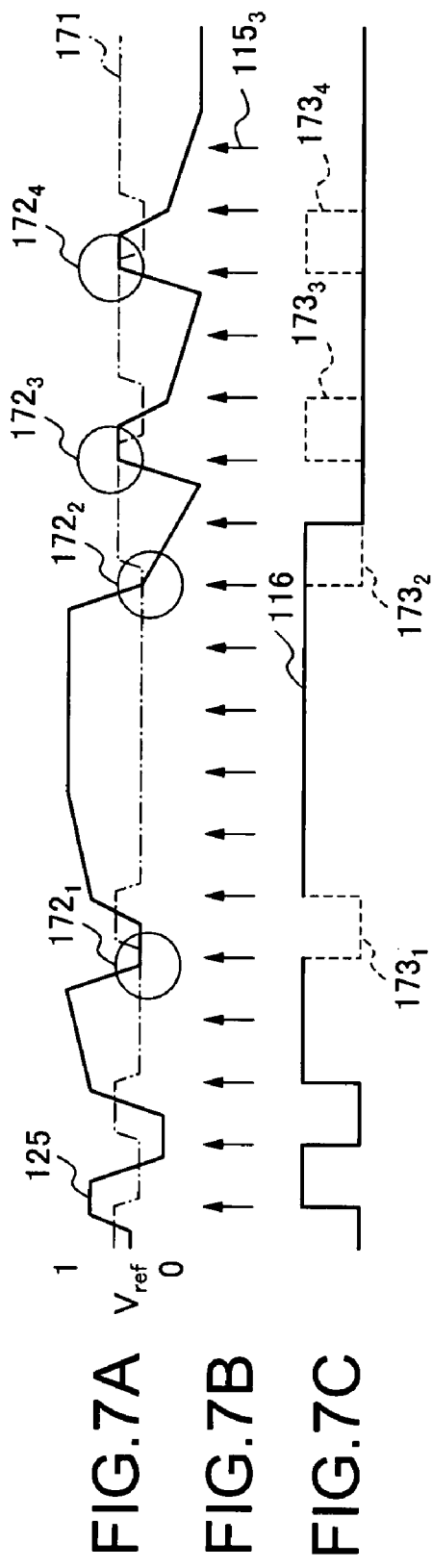
FIG. 7A to FIG. 7C are waveform diagrams with respect to the same reception data and output data as those of FIG. 5A~5C in a case where the reference voltage "Vref" shown in the conventional technique disclosed in JP-A-9-232923 is employed.

For the purpose of reference, FIG. 7 is a waveform diagram for representing data output from the third flip-flop circuit 113 when the reference voltage Vref disclosed in JP-A-9-232923 is employed in such a case that the same reception data as that of FIG. 5 is inputted to the input buffer 112. FIG. 7A shows the same reception data 125 as that of FIG. 5, and the reference voltage adjusting signal 171 of the reference voltage Vref based upon the basic idea disclosed in JP-A-9-232923. In this case also, the reference voltage Vref is not properly controlled. As a result, a voltage difference between the reception data 125 (see FIG. 7A) and the reference voltage adjusting signal 171 (see FIG. 7A) of the reference voltage Vref becomes improper at each of places indicated by circles $172_1$ to $172_4$. As a result, the noise margin becomes substantially zero. As a consequence, when the third flip-flop circuit 113 captures data in response to the third clock signal $115_3$ (see FIG. 7B), there are some possibilities that a failure may occur. In other words, there is such a risk that errors indicated by broken-line portions $173_1$ to $173_4$ may occur in the reception data 116 (see FIG. 7C) output from the third flip-flop circuit 113.

Figure 8:
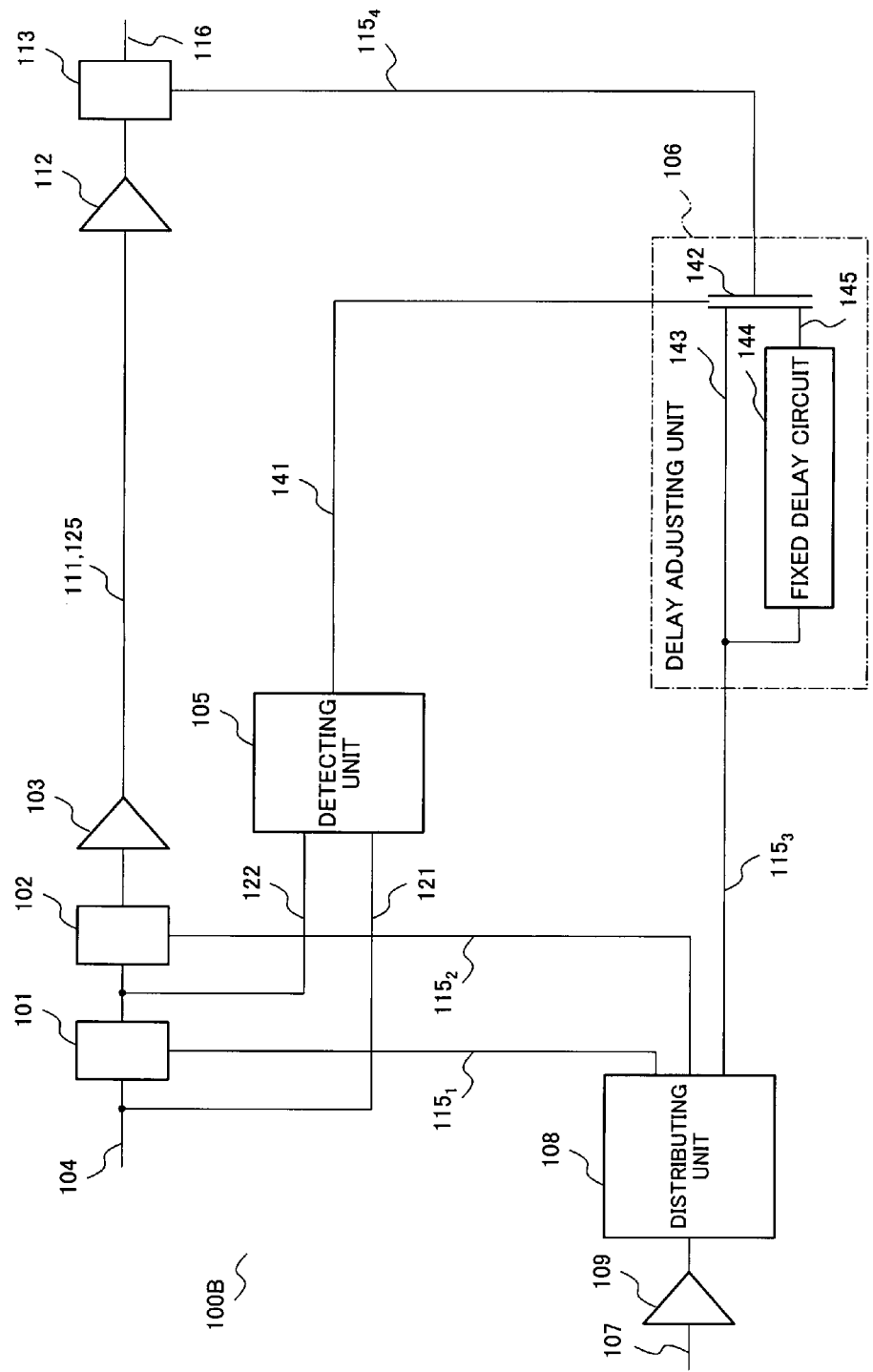
FIG. 8 is a circuit diagram for showing an interface circuit which is arranged by deleting a reference voltage control unit from the circuit diagram shown in FIG. 4, and by adding a delay adjusting unit.

FIG. 8 is a circuit diagram of an interface circuit 100B arranged by removing the reference voltage control unit from the circuit indicated in FIG. 4, and adding a delay adjusting unit 106. A detecting unit 105 in the interface circuit 100B detects that a logic state of the transmission data 104 is switched from "0" to "0", from "0" to "1", from "1" to "0", or from "1" to "1".

Under such a condition that the logic states of the potential signals 121 and 122 which are entered to the detecting unit 105 are changed from "0" to "1", or from "1" to "0", the delay adjusting unit 106 minimizes the delay amount thereof. In other words, the delay adjusting unit 106 outputs the third clock signal $115_3$ which has passed through the line path 143 and has no delay as the fourth clock signal $115_4$.

Also, under such a condition that the logic states of the potential signals 121 and 122 which are entered to the detecting unit 105 are not changed in the case of "0" to "0" or "1" to "1", the delay adjusting unit 106 delays the phase of the third clock signal $115_3$ via the fixed delay circuit 144 so as to output the delayed third clock signal $115_3$ as the fourth clock signal $115_4$.

Figure 9:
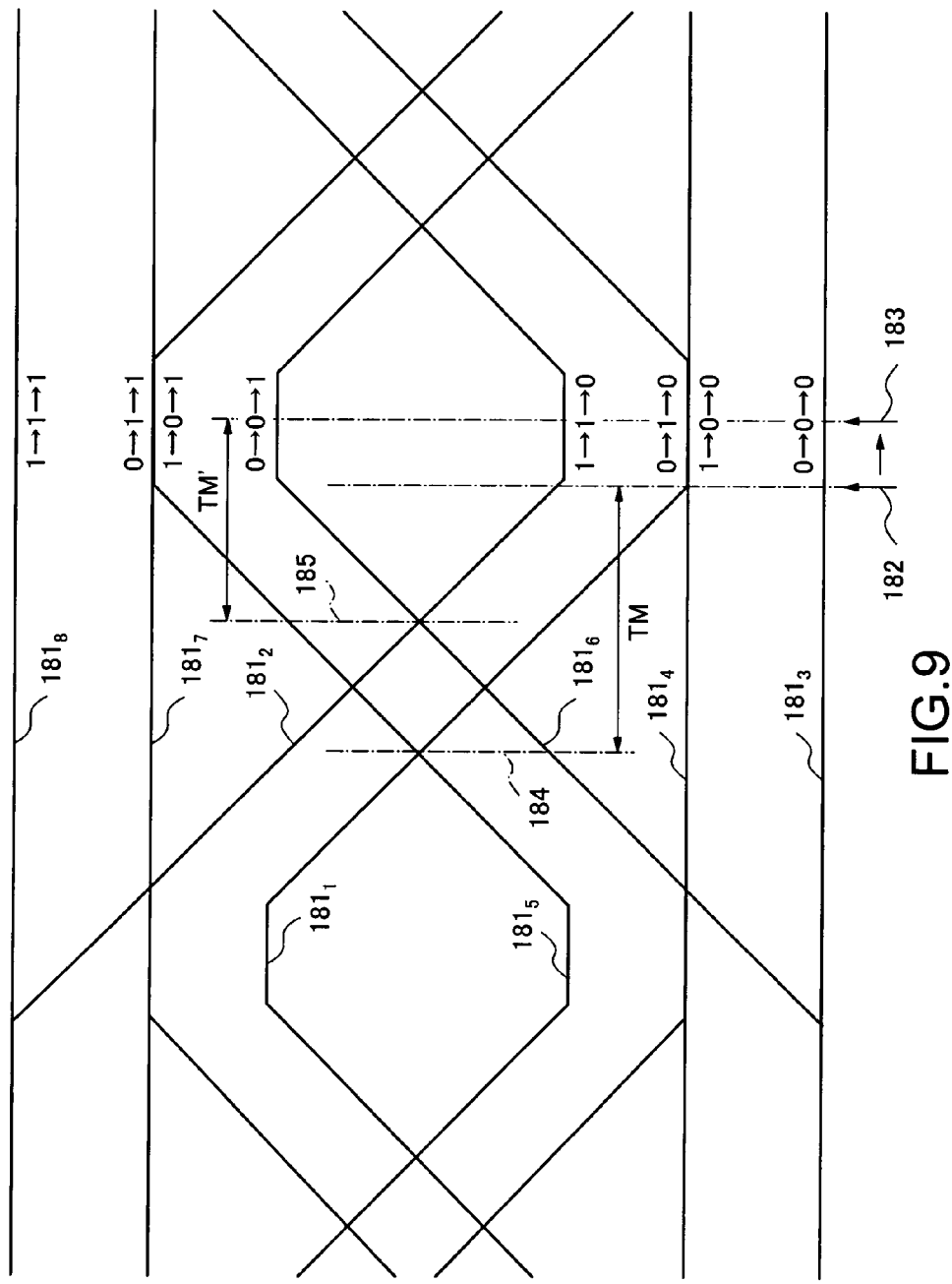
FIG. 9 is a diagram for representing a waveform of reception data by an eye pattern entered to an input buffer of the interface circuit shown in FIG. 8.

FIG. 9 corresponds to FIG. 3, and is a diagram for showing a change in waveforms of the reception data 125 of the input buffer 112 shown in FIG. 8 by using an eye pattern. FIG. 9 represents such a condition that switching timing of a signal is fluctuated, depending upon switching methods of logic states of data on the transmission side. It should be noted that the waveform change is shown in a simplified manner in FIG. 9, assuming that there is no influence caused by reflection noise and the like.

For instance, it is assumed that a present logic state of the reception data 125 shown in FIG. 8 is equal to "0". Then, in the case where the logic state of the reception data was changed from "0" to "1", and thereafter, becomes the present state of "0", as indicted by a line $181_1$ of FIG. 9, the logic state of the reception data is switched at the earliest time. Also, in the case where the logic state of the reception data was not changed in the case of "1" to "1", and thereafter, becomes the present state of "0", as indicated by a line $181_2$ of FIG. 9, the logic state of the reception data is switched at the latest time.

Also, in a case where, as indicated by a line $181_3$, after the logic state of the reception data was not changed in the case of "0" to "0", and as represented by a line $181_4$, the logic state of the reception data was changed from "1" to "0", and thereafter becomes the present state of "0", the logic state of the reception data 125 is not switched.

In a similar manner, it is assumed that a present logic state of the reception data 125 shown in FIG. 8 is equal to "1". Then, in the case where the logic state of the reception data was changed from "1" to "0", and thereafter, becomes the present state of "1", as indicted by a line $181_5$ of FIG. 9, the logic state of the reception data is switched at the earliest time. Also, in the case where the logic state of the reception data 125 was not changed in the case of "0" to "0", and thereafter, becomes the present state of "1", as indicated by a line $181_6$ of FIG. 9, the logic state of the reception data is switched at the latest time.

Also, in a case where, as indicated by a line $181_7$, after the logic state of the reception data was changed from "0" to "1", and as represented by a line $181_8$, the logic state of the reception data was not changed in the case of "1" to "1", and thereafter becomes the present state of "1", the logic state of the reception data is not switched.

A difference between timing at which data is switched and the fourth clock signal $115_4$ for capturing the data in the third flip-flop circuit 113 is referred as a "timing margin". Such a condition that the timing margin becomes the severest margin and that constitutes a problem in increasing the operating frequency occurs when the logic state of the reception data was not changed in the case of "1" to "1" and thereafter becomes "0", or when the logic state thereof was not changed in the case of "0" to "0" and thereafter becomes "1". In order to secure a required timing margin TM' at this time, a clock of the third flip-flop circuit 113 is not at the original time instant 182, but becomes a time instant 183 which is delayed from the original time instant 182.

Also, the time margins are slightly enlarged in the following three cases (A) to (C), namely, (A) when the logic state of the reception data 125 was changed from "1" to "0", and thereafter is changed to "0"; (B) when the logic state of the reception data 125 was changed from "0" to "1", and thereafter is changed to "0"; and (C) when the logic state of the reception data 125 was changed from "0" to "1", and thereafter is changed to "1", so the timing margin becomes such a time duration from a time instant 184 of FIG. 9 to the clock signal. Further, (D) when the logic state of the reception data 125 was not changed in the case of "0" to "0", and thereafter is changed to "0"; and (E) when the logic state of the reception data 125 was not changed in the case of "1" to "1", and thereafter is changed to "1", the timing margin becomes sufficiently large.

Therefore, the phase of the clock signal can be shifted to a time instant earlier than the time instant 183, when switching of the data other than the case where the logic state of the reception data 125 was not changed in the case of "1" to "1", and thereafter is changed to "0", or where the logic state thereof was not changed in the case of "0" to "0", and thereafter is changed to "1" is performed.

For example, even in such a case that the phase of the time instant 182 shown in FIG. 9 is set, the timing margin becomes such a time TM defined from the time instant 184 up to the time instant 182. This timing margin becomes larger than the time TM' defined from the time instant 185 up to the time instant 183.

As a consequence, as described in the operations of FIG. 8, when the output of the detecting unit 105 is changed from "0" to "1" or from "1" to "0", the phase of the clock signal of the third flip-flop circuit 113 is located at the time instant 182. Also, when the output of the detecting unit 105 is not changed in the case of "0" to "0" or "1" to "1", the phase of the clock signal of the third flip-flop circuit 113 is located at the time instant 183. With employment of this arrangement, a total number of the flip-flop circuits which are operated at the same time is decreased. As a result, without changing the operating frequency to low, the occurrences of the power supply noise and electromagnetic wave failure caused by the EMI can be reduced.

Figure 10:
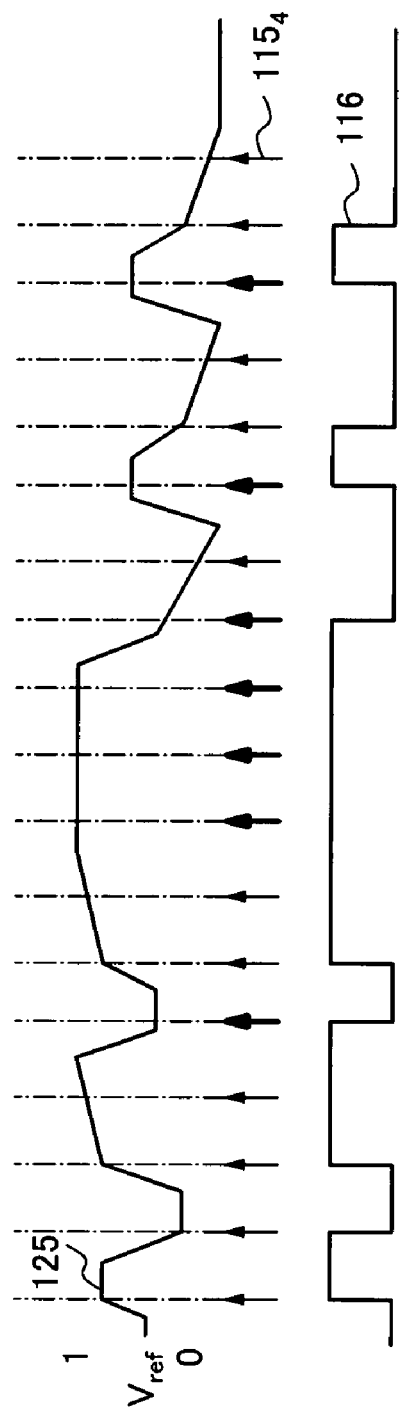
FIG. 10 is a diagram for showing waveforms of the reception data 125 entered to the input buffer 112 and data output from the third flip-flop circuit 113 in the circuit arrangement shown in FIG. 8.

FIG. 10 is a diagram for showing waveforms of the reception data 125 entered to the input buffer 112 and data outputted from the third flip-flop circuit 113 in the circuit arrangement shown in FIG. 8. FIG. 10A shows a waveform change of the amplitude of the reception data 125 of the input buffer 112. FIG. 10B shows the fourth clock signal $115_4$. FIG. 10C represents a waveform of the data 116 output from the third flip-flop circuit 113.

As previously described in the operations of FIG. 8, in such a case that the logic states of the potential difference signals 121 and 122 which are input to the detecting unit 105 are changed from "0" to "1", or from "1" to "0", the delay adjusting unit 106 sets the phase of the clock signal of the third flip-flop circuit 113 to the position of the time instant 182 of FIG. 9.

Also, in such a case that the logic states of the potential difference signals 121 and 122 which are input to the detecting unit 105 are not changed in the case of "0" to "0" or "1" to "1", the delay adjusting unit 106 sets the phase of the clock signal of the third flip-flop circuit 113 to the position of the time instant 183 of FIG. 9.

It should be noted that in FIG. 10B, clock edges (equivalent to time instant 182 of FIG. 9) are indicated by small-sized arrows when the delay adjusting unit 106 minimizes the delay. Also, clock edges (equivalent to time instant 183 of FIG. 9) are indicated by large-sized arrows when the delay adjusting unit 106 delays the phase. Since the phase adjustments are carried out in the above-mentioned manner, a total number of the flip-flop circuits which are operated at the same time is reduced.

For the purpose of reference, FIG. 11C is a waveform diagram for showing data output from the third flip-flop circuit by employing such a conventional technique that all of the flip-flop circuits are operated at the same time when the same reception data 125 as that of FIG. 10 is entered to the input buffer. FIG. 11A shows an amplitude of the reception data 125 entered in the input buffer 112. FIG. 11B shows respective timing of the fourth clock signal $115_4$. FIG. 11C shows a waveform of the data 116 output from the third flip-flop circuit 113. As previously described, in FIG. 10B, clock edges are indicated by small-sized arrows (equivalent to time instant 182 of FIG. 9) when the delay adjusting unit 106 minimizes the delay. Also, clock edges are indicated by large-sized arrows (equivalent to time instant 183 of FIG. 9) when the delay adjusting unit 106 delays the phase. It should also be noted that respective clock timing of FIG. 11B is drawn in accordance with a similar method for the purpose of reference although the conventional technique dose not employ such arrangement.

Figure 11:
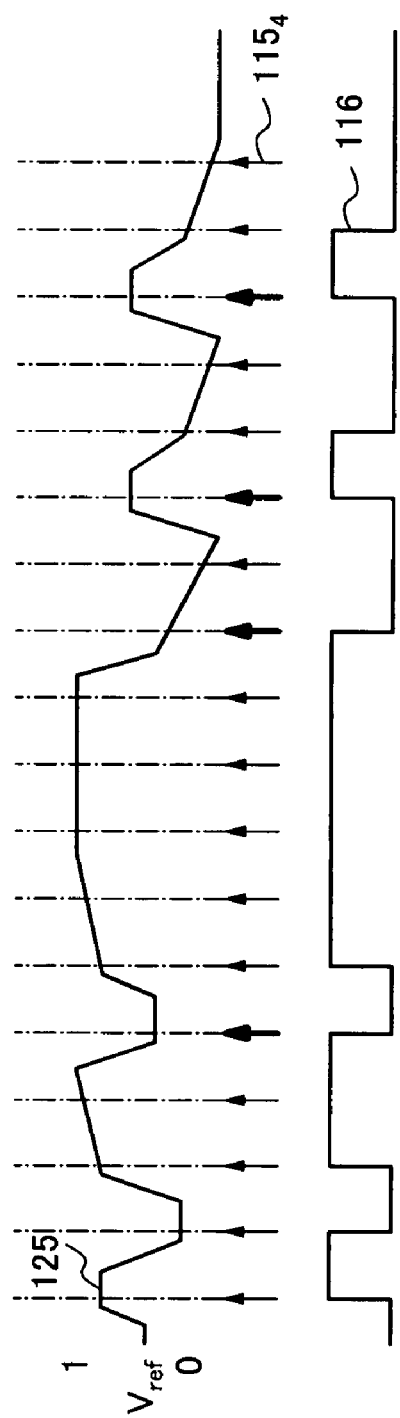
FIG. 11A to FIG. 11C are waveform diagrams in a case where the same reception data and output data as those of FIG. 10A~10C is received by employing the conventional technique in which all of the flip-flop circuits are operated at the same time.

FIG. 10 of this embodiment is compared with FIG. 11 of the conventional technique. In FIG. 10, even when the data is switched in such a manner that the timing margin becomes the severest margin (namely, positions (time instants) indicated by large-sized arrows), namely, even when the logic state of the data was not changed in the case of "1" to "1" and thereafter is changed to "0", or when the logic state thereof was not changed in the case of "0" to "0" and thereafter is changed to "1", time length of such a timing margin can be adjusted appropriately as previously described.

On the other hand, in the conventional technique, time length of the timing margin cannot be adjusted at positions indicated by large-sized arrows in FIG. 11B. Therefore, a countermove such as reducing the operating frequency is needed at those positions for preventing the EMI problems from being arisen.

Now, returning to FIG. 2, a description is made of the interface circuit 100 equipped with a function for enlarging a noise margin of reception data, and a function for reducing the EMI problems due to simultaneous operations of the third flip-flop circuit. The detecting unit 105 detects such switching timing that the transmission data 104 is changed from "0" to "0", from "0" to "1", from "1" to "0", or from "1" to "1" by employing the potential signals 121 and 122.

In the reference voltage control unit 114, when the logical outputs 134 and 136 of the detecting unit 105 are changed form "0" to "1", or from "1" to "0", both the upper-side transistor 135 and the lower-side transistor 139 in the reference voltage control unit 114 are cut off. Then, the reference voltage Vref controlled by the reference voltage adjusting signal 124 becomes the center level of the amplitude of the reception data 125.

Also, when the logical outputs 134 and 136 of the detecting unit 105 are not changed in the case of "0" to "0", the upper-side transistor 135 in the reference voltage control unit 144 is brought into a cut off state, and the lower-side transistor 139 is brought into a conduction state. Then, the reference voltage Vref controlled by the reference voltage adjusting signal 124 becomes lower than the center level of the amplitude of the reception data 125.

Also, when the logical outputs 134 and 136 of the detecting unit 105 are not changed in the case of "1" to "1", the upper-side transistor 135 in the reference voltage control unit 114 is brought into a conduction state, and the lower-side transistor 139 is brought into a cut off state. Then, the reference voltage Vref controlled by the reference voltage adjusting signal 124 becomes higher than the center level of the amplitude of the reception data 125.

When the logical output of the detecting unit 105 is changed from "0" to "1", or from "1" to "0", the delay adjusting unit 106 minimizes the delay amount by selecting the line path 143 by the selector 142.

On the other hand, when the logical output of the detecting unit 105 is not changed in the case of "0" to "0" or "1" to "1", the delay adjusting unit 106 delays the phase of the fourth clock signal $115_4$ supplied to the third flip-flop circuit 113 by selecting the clock which has passed the fixed delay circuit 144 by the selector 142.

Figure 12:
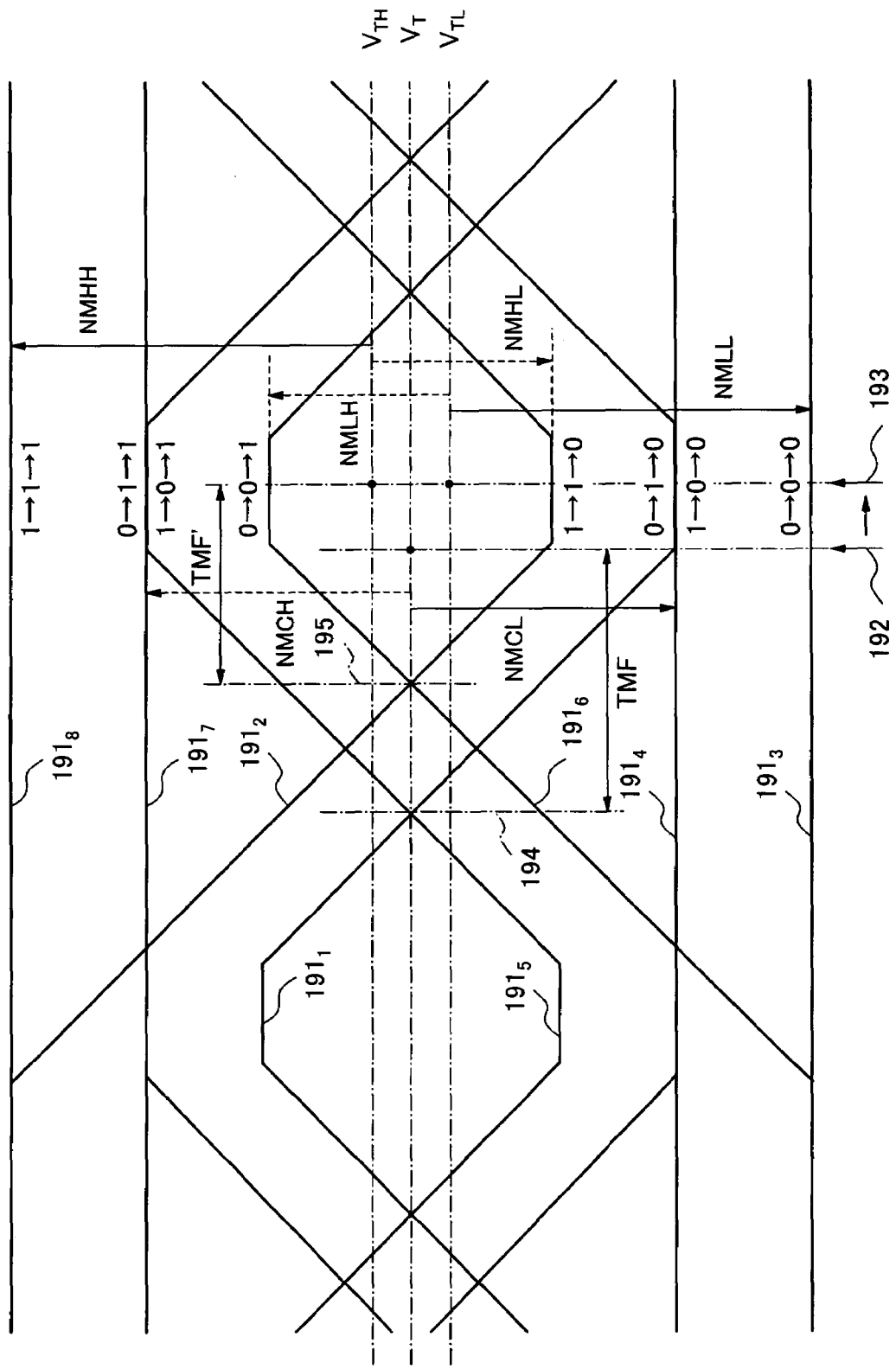
FIG. 12 is a diagram for representing a waveform of reception data by an eye pattern entered to the input buffer of the interface circuit shown in FIG. 2.

FIG. 12 is a diagram for showing a change in waveforms of reception data of the input buffer 112 provided in the interface circuit having the arrangement of FIG. 2 by using an eye pattern. FIG. 12 represents conditions where signal levels of the reception data 125 are fluctuated when the transmission data 104 is switched from "0" to "0", from "0" to "1", from "1" to "0", or from "1" to "1", in a simplified manner. It is assumed that there is no influence caused by reflection noise and the like. It should also be noted that lines $191_1$ to $191_8$ shown in FIG. 12 correspond to the above-mentioned lines $181_1$ to $181_8$ in FIG. 9, respectively.

Also, in FIG. 12, the clock of the third flip-flop circuit 113 is not adjusted to the original time instant 192, but to another time instant 193 which is delayed from the original time instant 192. Even in the interface circuit 100 shown in FIG. 2, the phase of the clock signal may be shifted to be before the time instant 193, when switching of the data other than the case where the state of the data was not changed in the case of "1" to "1" and thereafter is changed to "0", or where the state of this data was not changed in the case of "0" to "0" and thereafter is changed to "1" is performed. For example, even in the case where the phase of the time instant 192 of FIG. 12 is set, a timing margin becomes a time TMF defined from a time instant 194 up to a time instant 192, so a larger margin than the time TMF' defined from a time instant 195 up to a time instant 193 can be secured.

FIG. 13 is a diagram for showing waveforms of the reception data 125 entered to the input buffer 112 and data output from the third flip-flop circuit 113 in the interface circuit 100 having the circuit arrangement shown in FIG. 2. FIG. 13A shows a change in the amplitudes of the reception data 125 of the input buffer 112, and a waveform change of the reference voltage Vref indicated by the reference voltage adjusting signal 124. FIG. 13B indicates a fourth clock signal $115_4$. FIG. 13C represents a waveform of the data 116 output from the third flip-flop circuit 113. It should also be noted that in FIG. 13 and FIG. 12, clock edges are indicated by small-sized arrows (equivalent to time instant 192 of FIG. 12) when the delay adjusting unit 106 minimizes the delay. Also, clock edges are indicated by large-sized arrows (equivalent to time instant 193 of FIG. 12) when the delay adjusting unit 106 delays the phase.

As represented in FIG. 12 and FIG. 13, as previously described by using FIG. 3 and FIG. 5, when the reception side of the interface circuit 100 shown in FIG. 2 receives data, the noise margin is enlarged. As a result, the operating frequency can be improved.

Also, as previously described with using FIG. 9 and FIG. 10, a total number of such flip-flop circuits which are operated at the same time can be reduced. As a result, without changing the operating frequency to low, the power supply noise and electromagnetic wave failure caused by the EMI can be reduced.

It should also be understood that the interface circuit 100 equipped with the delay adjusting unit 106 and the reference voltage control unit 114 shown in FIG. 2 has been described as the embodiment. However, the present invention may be alternatively applied to either the interface circuit 100A equipped with the reference voltage control unit 114 shown in FIG. 4 or the interface circuit 100B equipped with the delay adjusting unit 106 shown in FIG. 8.

Also, in this embodiment, both the first flip-flop circuit 101 and the second flip-flop circuit 102 have been arranged in front of the transmission buffer 103 of the transmission data 104. Alternatively, flip-flop circuits arranged in larger number of stages than the above-mentioned two stages may be arranged. Also, a similar storage means may be arranged. In this alternative case, the structures as to the delay adjusting unit 106 and the reference voltage control unit 114 are changed into structures which may be properly adapted to those multiple staged structures.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to refrain all equivalents of the claimed invention even if the claims are amended during prosecution.

What is claimed is:

1. An interface circuit for receiving and outputting a binary data signal in synchronization with a clock signal comprising:
    a detecting unit which detects a transition state of logic levels in received binary data signal corresponding to preceding two clock signals;
    a first output signal producing unit which produces an output binary data signal based on the received binary data signal by using a reference voltage for judging logic level of 0 or 1; and
    a reference voltage control unit which controls to vary the reference voltage to be supplied to the first output signal producing unit in accordance with the transition state detected by the detecting unit,
    wherein the detecting unit detects one of the transition states, from 0 to 0, from 0 to 1, from 1 to 0 and from 1 to 1, of the logic levels corresponding to preceding two clock signals.

2. The interface circuit according to claim 1,
    wherein the detecting unit outputs a result of detection to the reference voltage control unit; and
    wherein the reference voltage control unit controls to set the reference voltage being a center level of amplitude of the logic level when the result of detection is one of the transition states from 0 to 1 and from 1 to 0, to set the reference voltage being lower level than the center level when the result of detection is the transition state from 0 to 0, and to set the reference voltage being higher level than the center level when the result of detection is the transition state from 1 to 1.

3. The interface circuit according to claim 1, wherein the detecting unit comprising:
    a latching part which latches each of the logic levels in the received binary data signal corresponding to preceding two clock signals; and
    a first transition state detecting part which detects one of the transition states of the logic levels from 0 to 0, from 0 to 1, from 1 to 0 and from 1 to 1, outputs a first detecting signal when the transition state is from 1 to 1, and outputs a second detecting signal when the transition state is from 0 to 0,
    wherein, the reference voltage control unit controls to set the reference voltage being a center level of amplitude of the logic level when none of the first detecting signal and the second detecting signal is received, to set the reference voltage being lower level than the center level when the second detecting signal is received, and to set the reference voltage being higher level than the center level when the first detecting signal is received.

4. An interface circuit for receiving and outputting a binary data signal in synchronization with a clock signal comprising:
a detecting unit which detects a transition state of logic levels in received binary data signal corresponding to preceding two clock signals;
an output signal producing unit which produces an output binary data signal based on the received binary data signal by latching the binary data signal using the clock signal; and
a clock phase control unit which controls to vary a phase of the clock signal to be supplied to the second output signal producing unit in accordance with the transition state detected by the detecting unit,
wherein the detecting unit detects one of the transition states, from 0 to 0, from 0 to 1, from 1 to 0 and from 1 to 1, of the logic levels corresponding to preceding two clock signals.

5. The interface circuit according to claim 4,
wherein the detecting unit outputs a result of detection to the clock phase control unit; and
wherein the clock phase control unit controls to set the phase of the clock signal without delay when the result of detection is one of the transition states from 0 to 1 and from 1 to 0, and to set the phase of the clock signal with a predetermined delay when the result of detection is one of the transition states from 0 to 0 and from 1 to 1.

6. An interface circuit for receiving and outputting a binary data signal in synchronization with a clock signal comprising:
a detecting unit which detects a transition state of logic levels in received binary data signal corresponding to preceding two clock signals;
an output signal producing unit which produces an output binary data signal based on the received binary data signal by using a reference voltage for judging logic level of 0 or 1 and by latching the binary data signal using the clock signal;
a reference voltage control unit which controls to vary the reference voltage to be supplied to the output signal producing unit in accordance with the transition state detected by the detecting unit; and
a clock phase control unit which controls to vary a phase of the clock signal to be supplied to the output signal producing unit in accordance with the transition state detected by the detecting unit.

7. The interface circuit according to claim 6, wherein the detecting unit detects one of the transition states, from 0 to 0, from 0 to 1, from 1 to 0 and from 1 to 1, of the logic levels corresponding to preceding two clock signals, and outputs a result of detection to the reference voltage control unit and the clock phase control unit;
wherein the reference voltage control unit controls to set the reference voltage being a center level of amplitude of the logic level when the result of detection is one of the transition states from 0 to 1 and from 1 to 0, to set the reference voltage being lower level than the center level when the result of detection is the transition state from 0 to 0, and to set the reference voltage being higher level than the center level when the result of detection is the transition state from 1 to 1; and
wherein the clock phase control unit controls to set the phase of the clock signal without delay when the result of detection is one of the transition states from 0 to 1 and from 1 to 0, and to set the phase of the clock signal with a predetermined delay when the result of detection is one of the transition states from 0 to 0 and from 1 to 1.

8. The interface circuit according to claim 6, wherein the detecting unit comprising:
a latching part which latches each of logic levels in the received binary data signal corresponding to preceding two clock signals; and
a second transition state detecting part which detects one of the transition states of the logic levels from 0 to 0, from 0 to 1, from 1 to 0 and from 1 to 1, and outputs a first detecting signal when the transition state is from 1 to 1 and a second detecting signal when the transition state is from 0 to 0 to the reference voltage control unit, and outputs a first selecting signal when the transition state is from 0 to 1 or from 1 to 0, and a second selecting signal when the transition state is from 0 to 0 or from 1 to 1, to the clock phase control unit,
wherein, the reference voltage control unit controls to set the reference voltage being a center level of amplitude of the logic level when none of the first detecting signal and the second detecting signal is received, to set the reference voltage being lower level than the center level when the second detecting signal is received, and to set the reference voltage being higher level than the center level when the first detecting signal is received; and
wherein, the clock phase control unit controls to set the phase of the clock signal without delay when the first selecting signal is received, and to set the phase of the clock signal with a predetermined delay when the second selecting signal is received.

9. A method for transmitting a binary data signal in synchronization with a clock signal comprising:
a detecting step for detecting a transition state of logic levels in received binary data signal corresponding to preceding two clock signals;
a control step for controlling a voltage level of a reference signal used for judging logic level of 0 or 1 in accordance with a detecting result by the detecting step; and
a first output signal producing step for producing an output binary data signal based on the received binary data signal by using the reference signal,
wherein the detecting step detects one of the transition states, from 0 to 0, from 0 to 1, from 1 to 0 and from 1 to 1, of the logic levels corresponding to preceding two clock signals.

10. The method according to claim 9, wherein the detecting step comprising:
a detecting result output step for outputting a first detecting signal when the transition state is from 1 to 1, and outputs a second detecting signal when the transition state is from 0 to 0, wherein, the control step comprising a voltage level control step for controlling the voltage level of the reference signal to be a center level of amplitude of the logic level when none of the first detecting signal and the second detecting signal is received, to be lower level than the center level when the second detecting signal is received, and to be higher level than the center level when the first detecting signal is received.

11. A method for transmitting a binary data signal in synchronization with a clock signal comprising:
a detecting step for detecting a transition state of logic levels in received binary data signal corresponding to preceding two clock signals;
a control step for controlling to vary a phase of the clock signal to be used for detecting latching time in accordance with a detecting result by the detecting step; and an output signal producing step for producing an output binary data signal based on the received binary data signal by latching the binary data signal using the clock signal, wherein the detecting step detects one of the transition states, from 0 to 0, from 0 to 1, from 1 to 0 and from 1 to 1, of the logic levels corresponding to preceding two clock signals.

12. The method according to claim 11, wherein the control step for controlling to set the phase of the clock signal without delay when the result of detection is one of the transition states from 0 to 1 and from 1 to 0, and to set the phase of the clock signal with a predetermined delay when the result of detection is one of the transition states from 0to 0 and from 1 to 1.

13. A method for transmitting a binary data signal in synchronization with a clock signal comprising:

a detecting step for detecting a transition state of logic levels in received binary data signal corresponding to preceding two clock signals;

a control step for controlling a voltage level of a reference signal used for judging logic level of 0 or 1 and to vary a phase of the clock signal to be used for detecting latching time in accordance with a detecting result by the detecting step; and a first output signal producing step for producing an output binary data signal based on the received binary data signal by using the reference signal; and a second output signal producing step for producing an output binary data signal based on the received binary data signal by latching the binary data signal using the clock signal, wherein the detecting step detects one of the transition states, from 0 to 0, from 0 to 1, from 1 to 0 and from 1 to 1, of the logic levels corresponding to preceding two clock signals.

14. The method according to claim 13, wherein the detecting step comprises:

a detecting result output step for outputting a first detecting signal when the transition state is from 1 to 1, and outputs a second detecting signal when the transition state is from 0 to 0, wherein, the control step comprising a voltage level control step for controlling the voltage level of the reference signal to be a center level of amplitude of the logic level when none of the first detecting signal and the second detecting signal is received, to be lower level than the center level when the second detecting signal is received, and to be higher level than the center level when the first detecting signal is received.

* * * * *